(12) United States Patent
Jones et al.

(10) Patent No.: US 7,275,209 B1
(45) Date of Patent: Sep. 25, 2007

(54) MIXED CONTENT FLEXIBILITY FOR XML EDITORS

(75) Inventors: Brian Jones, Redmond, WA (US); Edgar Mark Sunderland, Seattle, WA (US); Robert Little, Redmond, WA (US); Martin Sawicki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 10/726,077

(22) Filed: Dec. 2, 2003

Related U.S. Application Data (63) Continuation-in-part of application No. 10/187,060, filed on Jun. 28, 2002.

(51) Int. Cl.
*G06F 17/00* (2006.01)

(52) U.S. Cl. .................................. 715/513; 715/501.1

(58) Field of Classification Search ................ 715/513, 715/501.1
See application file for complete search history.

(56) References Cited

OTHER PUBLICATIONS

Altova Inc. & Altova GmbH, "XML Spy 4.0 Manual," copyright 1998-2001, Sep. 10, 2001, downloaded from: http://www.altova.com/download_archive.html and link, pp. 18-286.*
"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.*
M. Fernandez and S. Amer-Yahia; *Advanced Technology Seminar 2—Techniques for Storing XML*; pp. 323, 774-776.
Michael Champion; *Storing XML in Databases*; EAI Journal, Oct. 2001; pp. 53-55.
JP Morgenthal; *XML for Data Integration*; EAI Journal, Oct. 2001; pp. 13-14, 16.
Sihem Amer-Yahia, Mary Fernandez, Divesh Srivastava and Yu Xu; *PIX: A System for Phrase Matching in XML Documents: A Demonstration*; 2003 IEEE; pp. 774-776.

* cited by examiner

*Primary Examiner*—William Bashore
*Assistant Examiner*—Laurie Ries
(74) *Attorney, Agent, or Firm*—Merchant & Gould P.C.

(57) ABSTRACT

The present invention is directed towards providing mixed content flexibility for word-processing document in an XML (or ML) file format. Mixed content can be provided within an XML file such that validation of the file will not produce errors even when an associated schema does not recognize the text. Additionally, the XML (or ML) file can be output such that the mixed content does not appear in the output file.

22 Claims, 13 Drawing Sheets

```xml
<?xml version="1.0" encoding="UTF-8" standalone="no" ?>
<article xmlns="urn:schemas-microsoftPress.article">
  <heading>
    <title>Microsoft ships Office with XML</title>
    <subTitle />
  </heading>
  <image>
    <imageFile />
    <imageTitle />
  </image>
  <body>
    <location />
    <date />
    <intro />
    <main />
  </body>
</article>
```

MIXED CONTENT FLEXIBILITY FOR XML EDITORS

RELATED APPLICATIONS

This patent application is a continuation-in-part application under 35 United States Code § 120 of U.S. patent application Ser. No. 10/187,060 filed on Jun. 28, 2002, which is incorporated herein by reference.

COMPUTER PROGRAM LISTING APPENDIX

A computer listing is included in a Compact Disc appendix in the attached CD ROM (quantity of one) in a file entitled Appendix.doc created on Feb. 1, 2007 of 757,760 bytes, and is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

Typically, XML editors to-date do not allow for mixed content. Mixed content occurs when sibling nodes of an element contain different types of content. Presently, validating mixed content in XML is problematic. What is needed is a way to easily handle mixed content that is present within an XML document so that errors do not occur during validation.

SUMMARY OF THE INVENTION

The present invention is directed towards providing mixed content flexibility for word-processing documents in an XML (or ML) file format. Mixed content can be provided within an XML file such that validation of the file will not produce errors even when an associated schema does not allow the text. Additionally, the XML (or ML) file can be output such that the mixed content does not appear in the output file.

According to one aspect of the invention, computer-readable medium having computer-executable components comprises three components. The first component is arranged to read a word-processor document stored as an XML file. The second component is arranged to use an XSD (or any type of system) for specifying the rule the word-processor document should adhere to. The third component is arranged to validate the word-processor document, such that the validation selectively ignores mixed content within the word-processor document.

According to another aspect of the invention, a method for handling a word-processing document comprises determining whether mixed content within the word-processing document is to be ignored. The word-processing document is parsed and validated such that mixed content does not cause validation errors when the determination has been made that mixed content within the word-processing document is to be ignored.

According to yet another aspect of the invention, a system for creating, interpreting, and modifying a word-processor document stored as an ML file, comprises an ML file, a validation engine, and a word processor. The validation engine is configured to validate the ML file, wherein the validation engine selectively validates mixed content. The word processor is configured to read an ML file created in accordance with an associated schema.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's structural function (e.g., heading, paragraph, etc.) The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
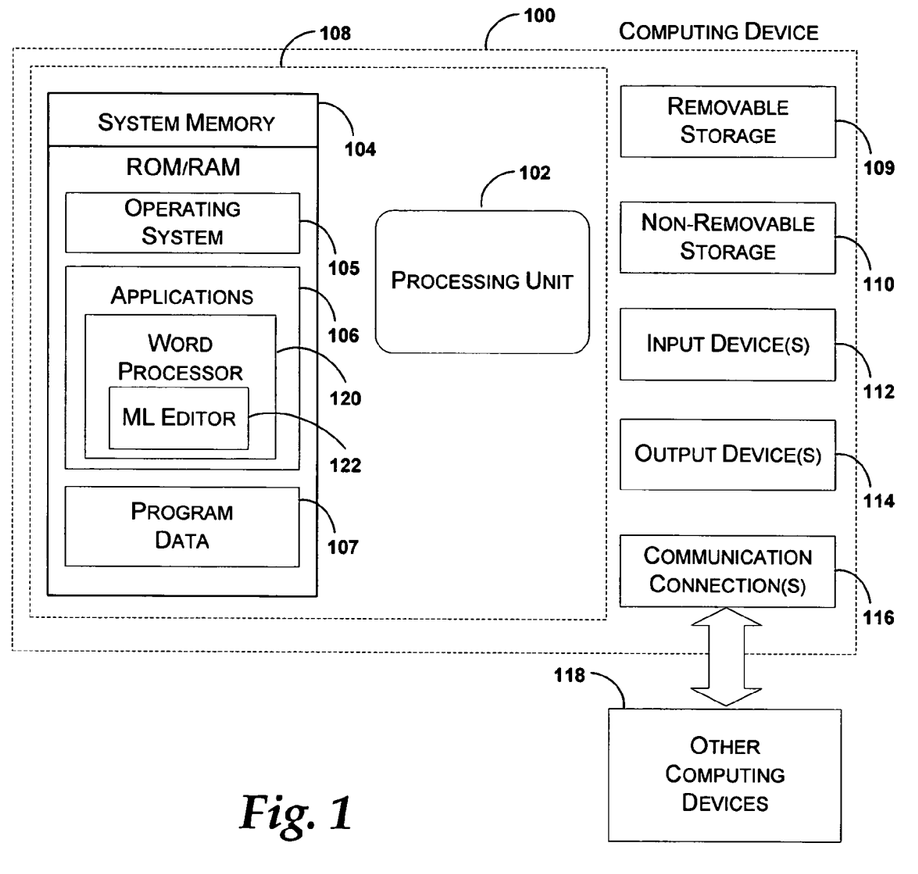
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes ML editor 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure

Figure 2:
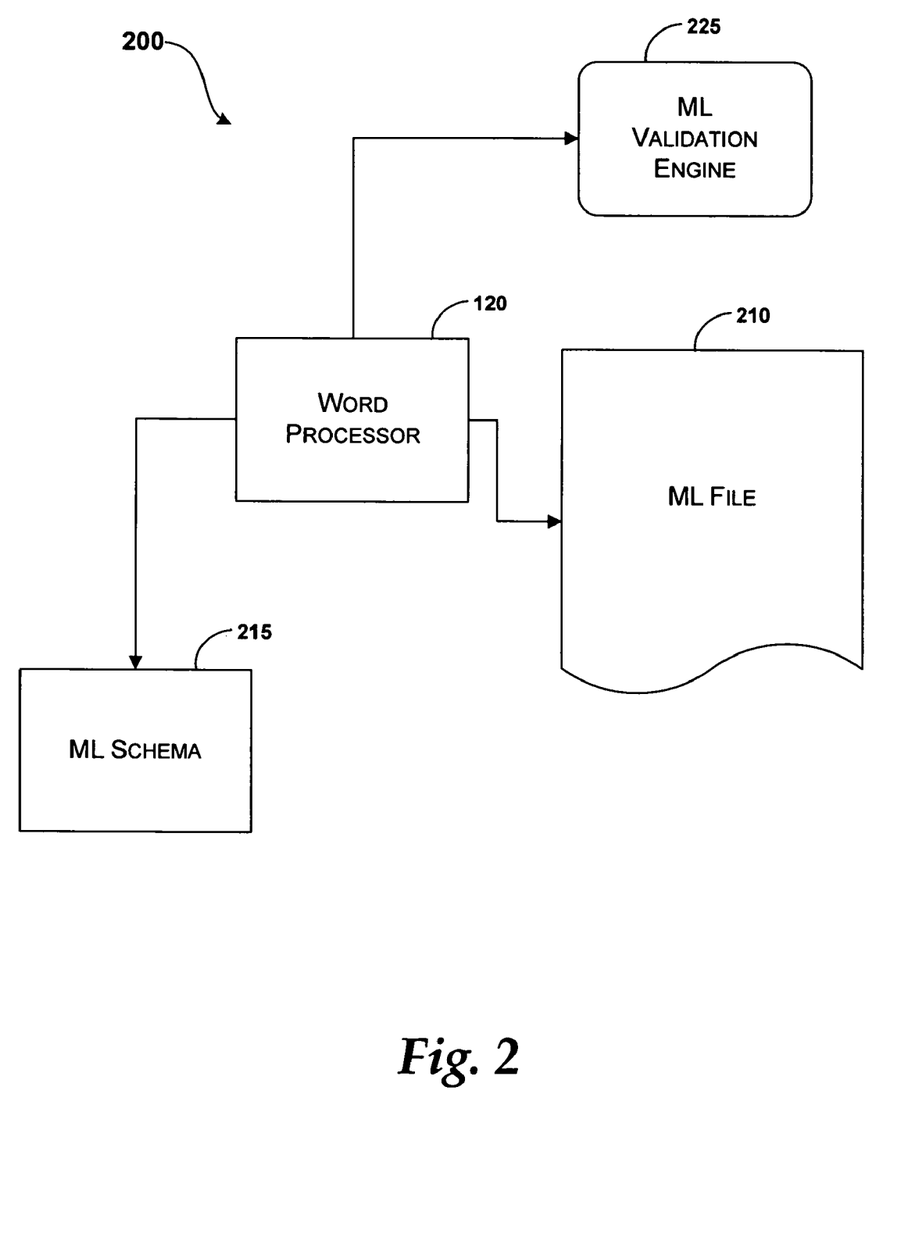
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML.

Word-processor 120 internally validates ML file 210. When validated, the ML elements are examined as to whether they conform to the ML schema 215. As previously described above, a schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Figure 3:
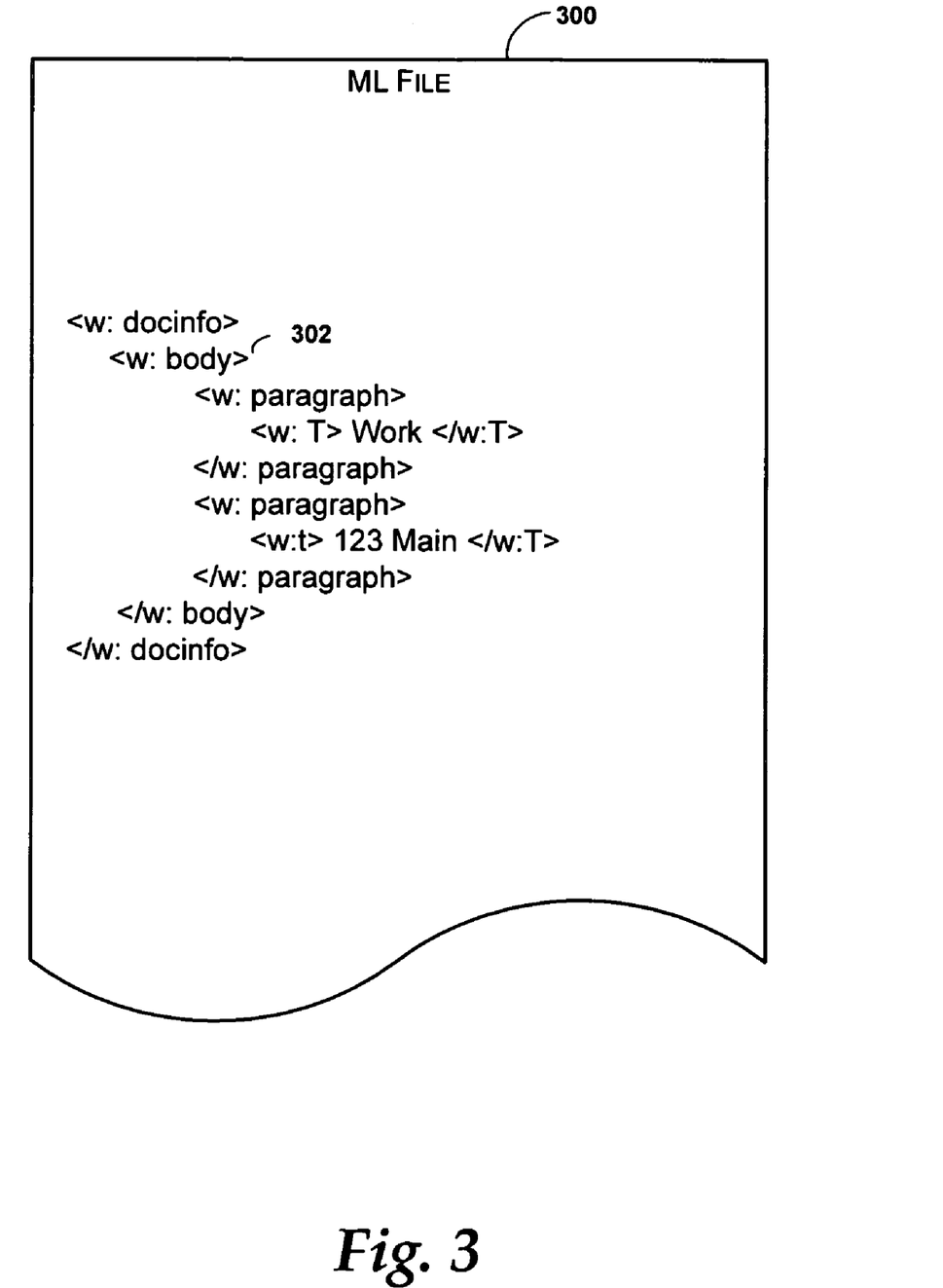
FIG. 3 illustrates an exemplary ML file in accordance with aspects of the present invention.

FIG. 3 illustrates an exemplary ML file in accordance with aspects of the present invention. ML file 300 includes ML elements. An element in a markup language usually includes an opening tag (indicated by a "<" and ">"), some content, and a closing tag (indicated by a "</" and ">"). In this example, tags associated with ML include a "w:" within the tag (e.g., 302). The "w:" prefix is used as shorthand notation for the namespace associated with the element.

There are enough ML elements for an application that understands XML to fully recreate the document from this single XML file. Hint tags may also be included that provide information to an application to help understand the content of the file. The text contained within the document follows the "T" tag, making it easy for an application to extract the text content from a word-processing document created in accordance with aspects of the invention. Given that the example shown is valid, ML file 210 produces a document with a body and two paragraphs that include the text "Work" in the first paragraph and "123 Main" in the second paragraph.

Figure 4:
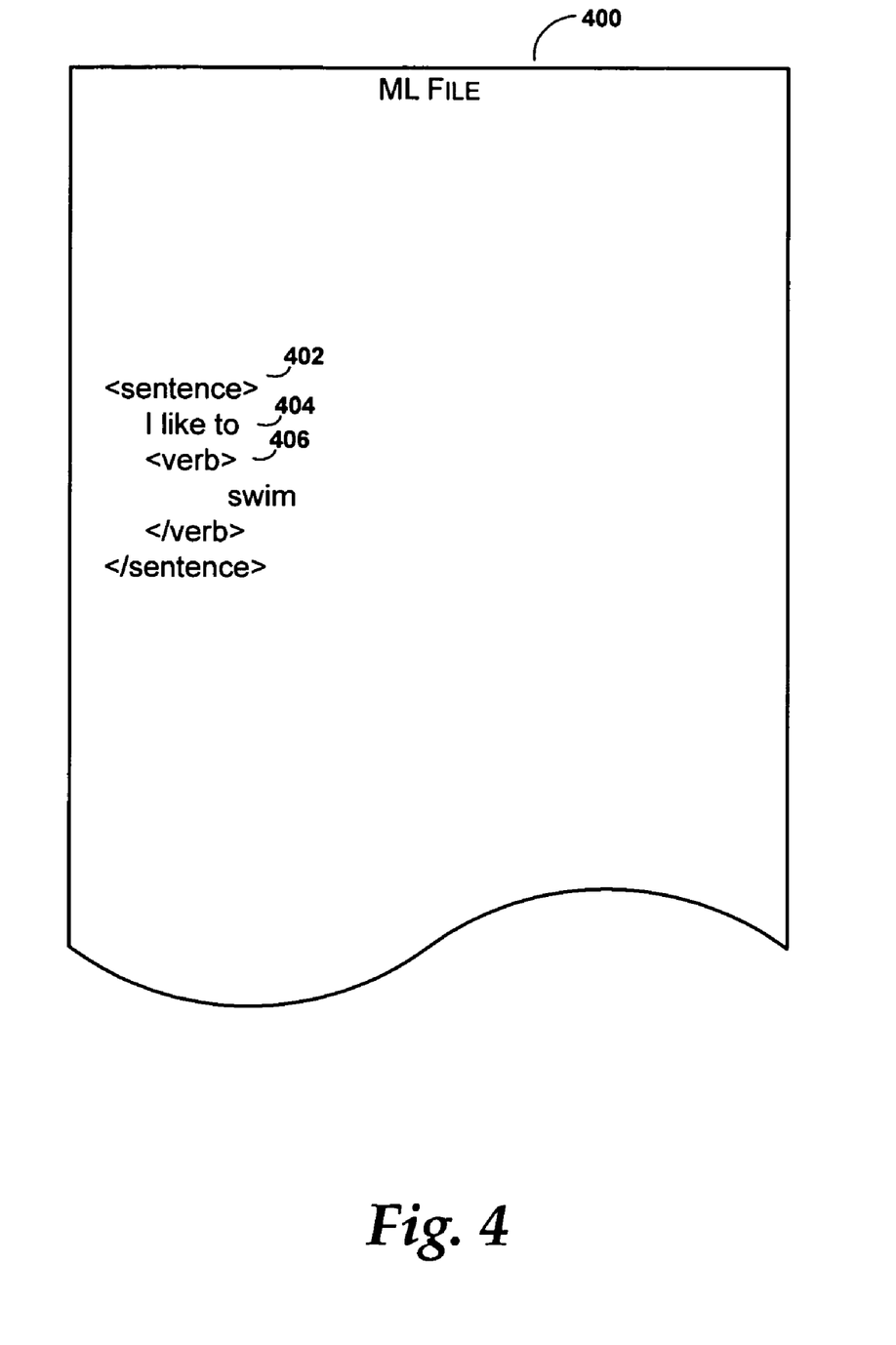
FIG. 4 illustrates an exemplary ML file comprising mixed contents, in accordance with aspects of the present invention.

FIG. 4 illustrates an exemplary ML file comprising mixed contents, in accordance with aspects of the present invention. ML file 400 comprises ML element 402 ("sentence"). Element 402 comprises two children: text node 404 ("I like to") and element 406 ("verb"). The mixed content is illustrated by the fact that text node 404 and element 406 are both siblings of the same parent element "sentence" (402).

Figure 5:
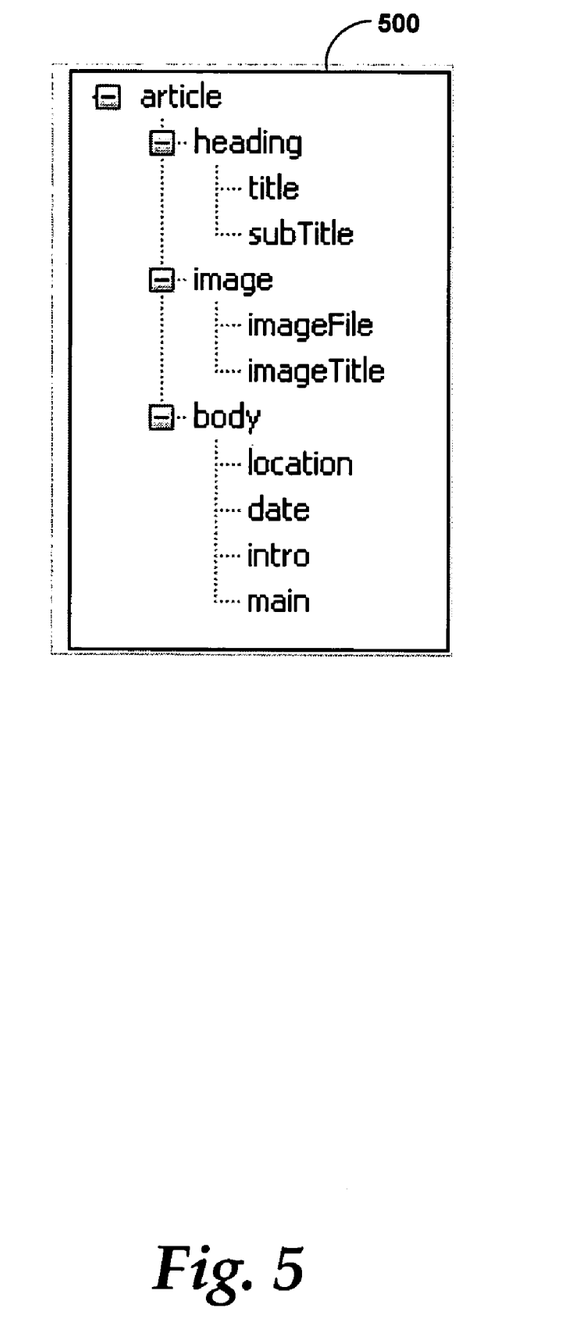
FIG. 5 illustrates an exemplary schema, in accordance with aspects of the invention.

FIG. 5 illustrates an exemplary schema, in accordance with aspects of the invention. Schema 500 is provided as an example of, for example, a news article. Schema 500 is organized in accordance with typical news articles and comprises a heading, image, and body.

Figure 6:
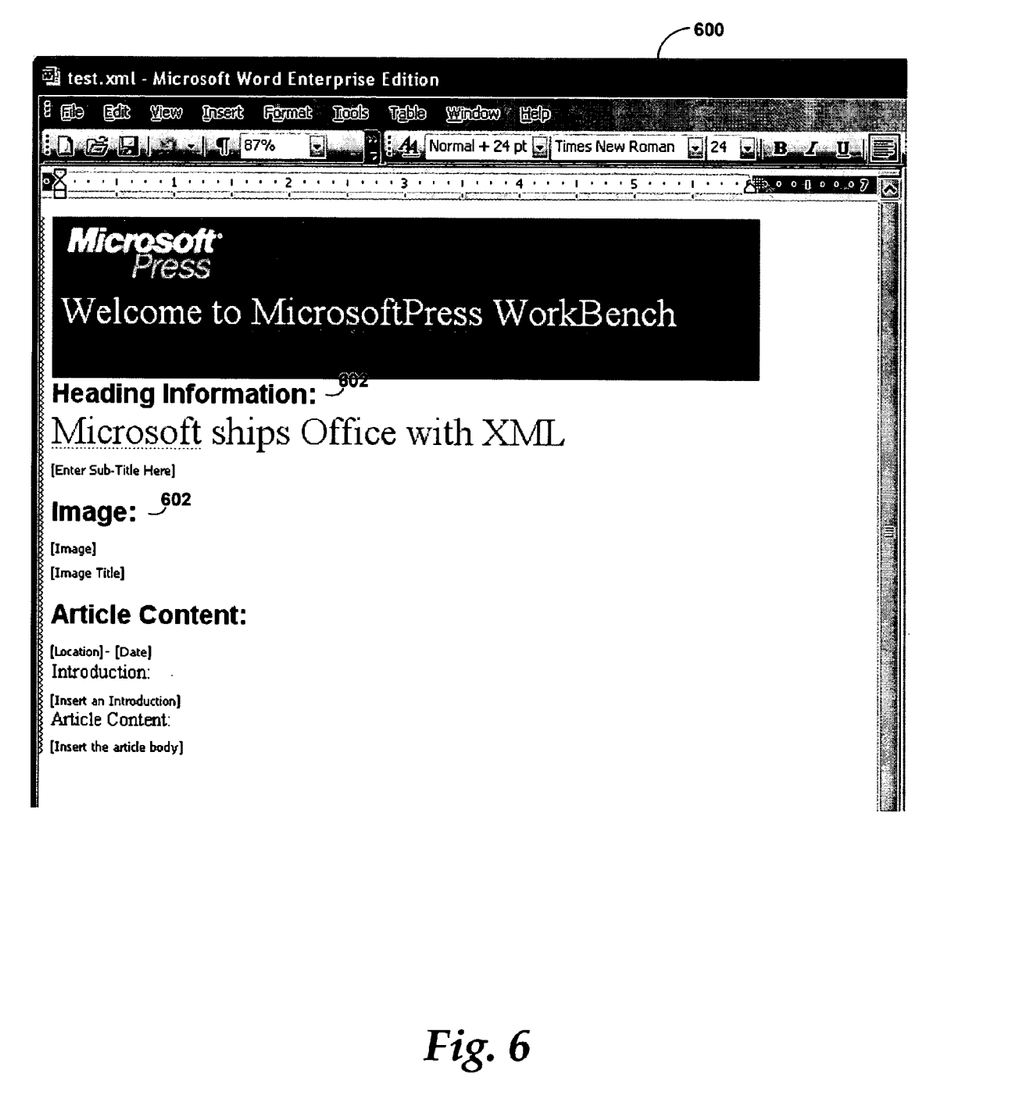
FIG. 6 illustrates an exemplary word processor template file for generating ML files that are associated with a schema, in accordance with aspects of the present invention.

FIG. 6 illustrates an exemplary word processor template file for generating ML files that are associated with a schema, in accordance with aspects of the present invention. Template file 600 is a template that is provided for "filling out" information in the file (600) in accordance with schema 500. ML file 600 comprises content (e.g., headings 602) that is not for inclusion within an actual news article, but is provided as visual promptings to make filling out file 600 easier.

Figure 7:
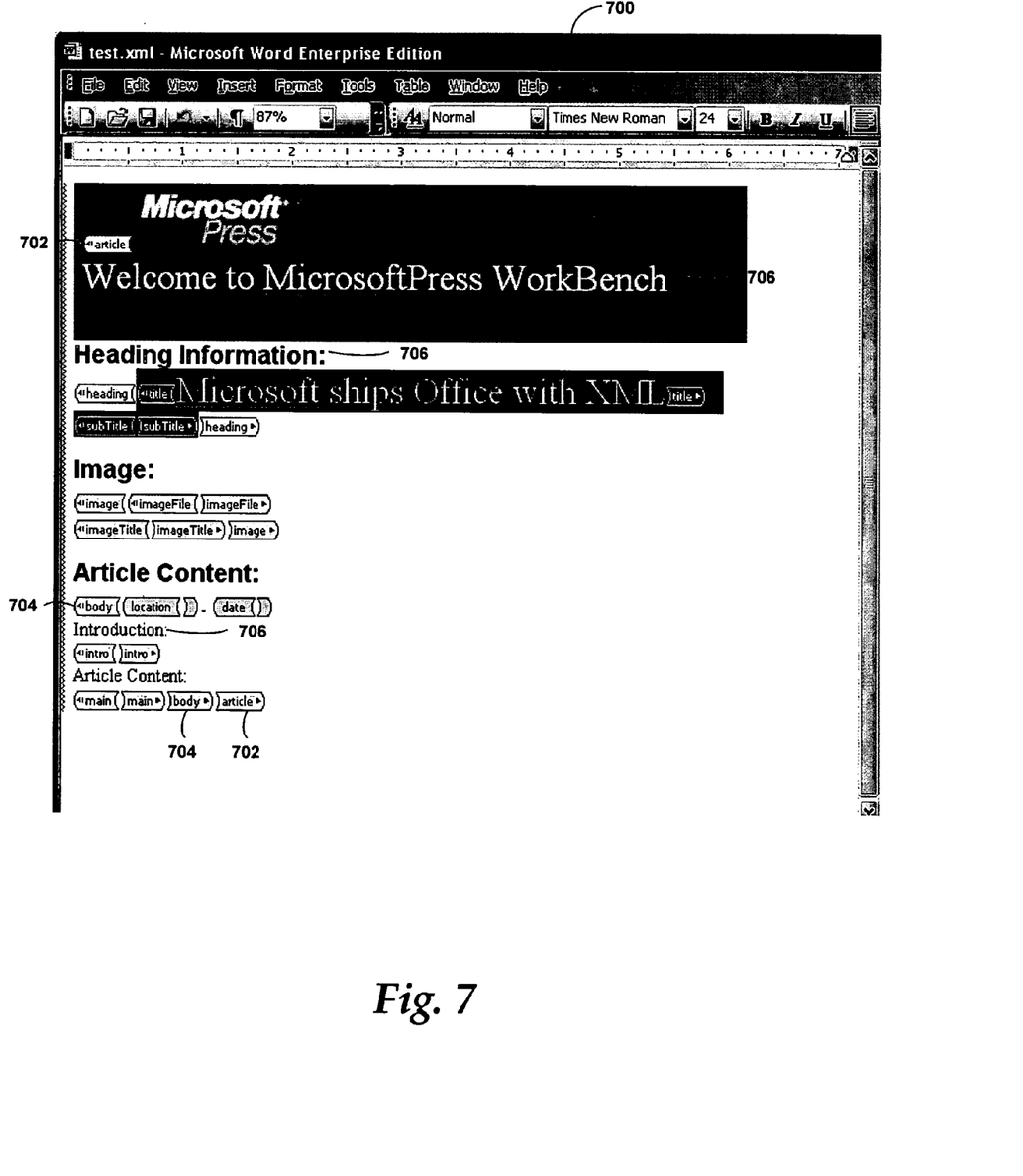
FIG. 7 illustrates an exemplary ML file that is generated according to an associated schema, in accordance with aspects of the present invention.

FIG. 7 illustrates an exemplary ML file that is generated according to an associated schema, in accordance with aspects of the present invention. ML file 700 comprises, for example, <article> tags 702 and <body> tags 704. Exemplary <article> tags 702 and <body> tags 704 comprise text fields 706, which are not actual content for inclusion in a news article, but are provided as titles for prompting user input.

If a word processor were to try to validate the ML file 700 against schema 500, there would be a number of errors. Errors would result in the validation because schema 500 does not specify text and only specifies other elements, for example, within the <article> and <body> tags.

Figure 8:
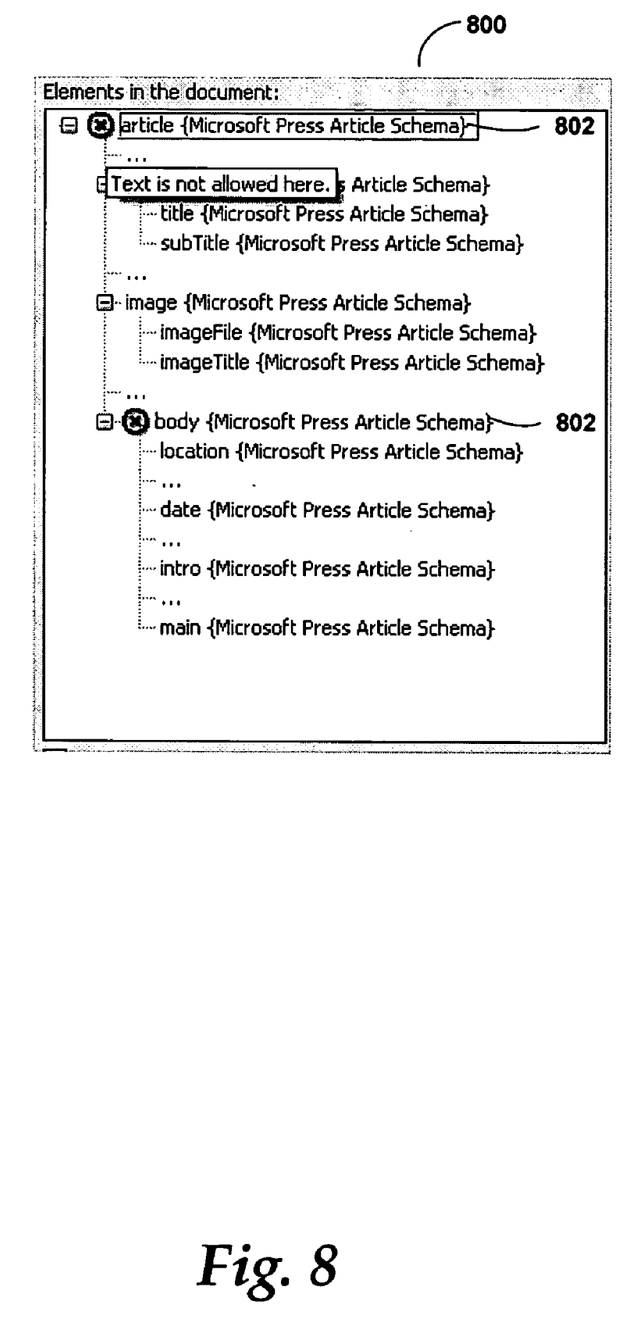
FIG. 8 illustrates an exemplary tree view of the results of a validation of an ML file that is generated according to an associated schema, in accordance with aspects of the present invention.

FIG. 8 illustrates an exemplary tree view of the results of a validation of an ML file that is generated according to an associated schema, in accordance with aspects of the present invention. Result file 800 comprises, for example, errors 802 that result from the presence of text outside of a node in the ML file. Accordingly, errors 802 illustrate problems in validating ML files containing mixed content.

Figure 9:
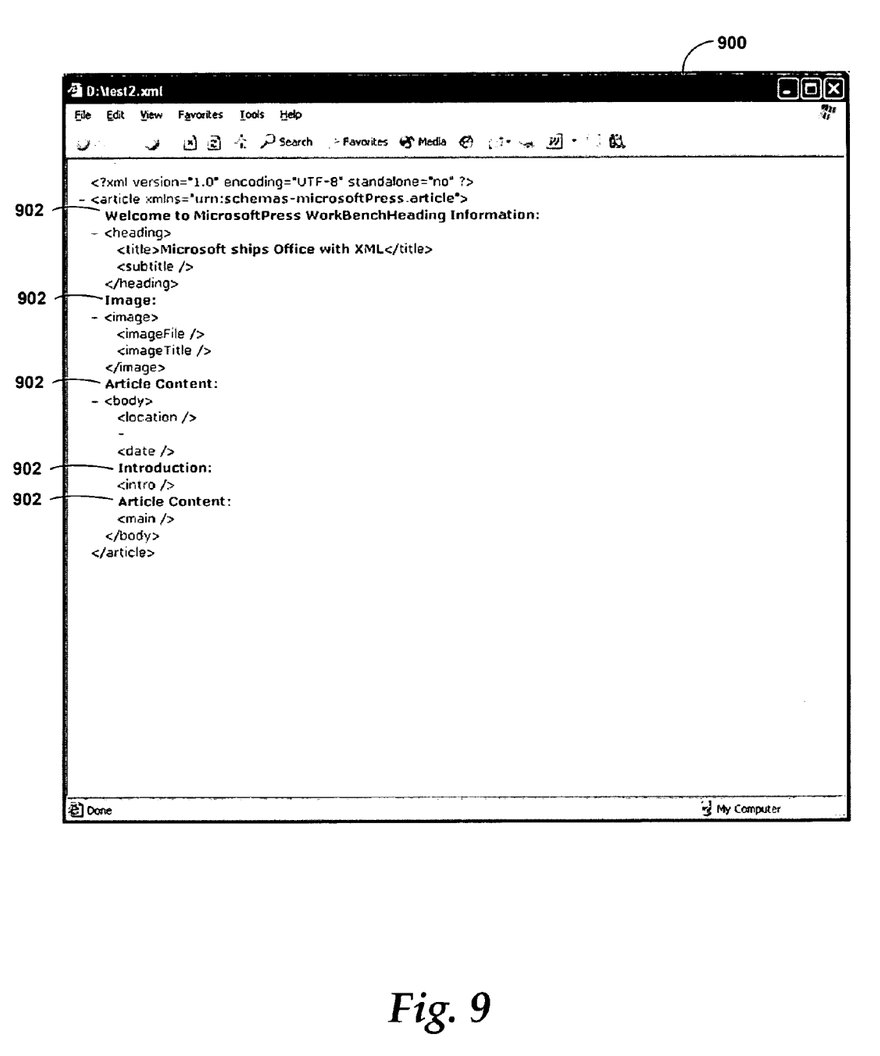
FIG. 9 illustrates an exemplary XML file that is generated according to an associated schema, in accordance with aspects of the present invention.

FIG. 9 illustrates an exemplary XML file that is generated according to an associated schema, in accordance with aspects of the present invention. XML file 900 comprises, for example, text 902 that is interspersed within the XML code. Text 902 results from mixed content that was present in, for example, template file 600. As discussed above, the text content was provided for convenience in filling out informational elements within the template file. However, the text content may not be useful in the context of the, for example, actual news article for which the XML (or ML) code is generated. It may also make it so that the file is invalid and is rejected by any processes that deal with the news article XML.

Figure 10:
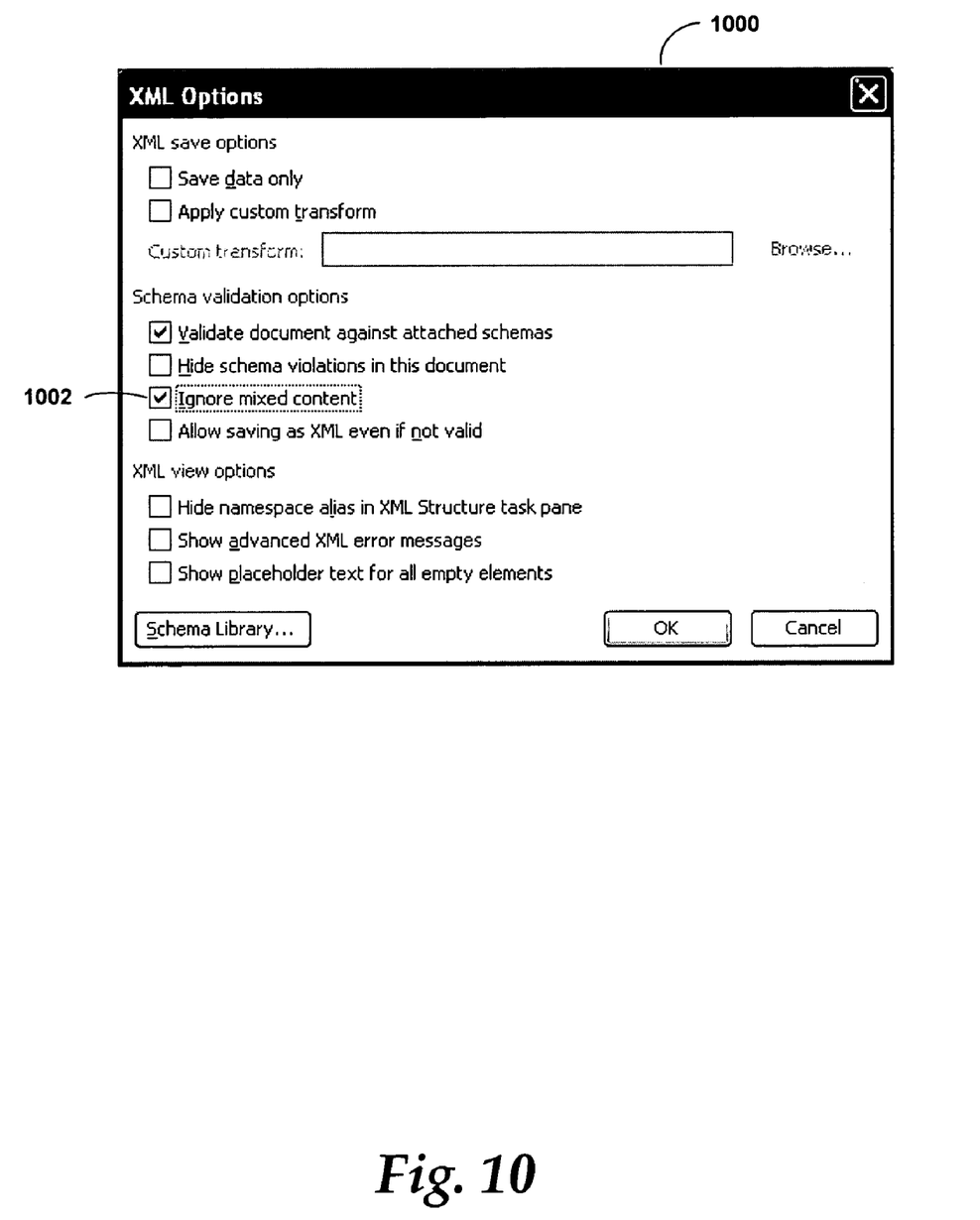
FIG. 10 illustrates a control dialog menu for selectively ignoring mixed content in ML files, in accordance with aspects of the present invention.

FIG. 10 illustrates an control dialog menu for selectively ignoring mixed content in ML files, in accordance with aspects of the present invention. Although control dialog menu 1000 is presented in the context of XML-related options, the options may be applied to other languages such as ML.

Control dialog menu 1000 provides a schema validation option 1002 that enables a programmer or user to select whether mixed content is to be ignored during validation. If the option 1002 is not selected, validation results are produced as illustrated by FIG. 8 and data output are produced as illustrated by FIG. 9. If the option 1002 is selected, mixed content is ignored such that validation results as illustrated by FIG. 11 are produced and data output as illustrated by FIG. 12 are produced.

Figure 11:
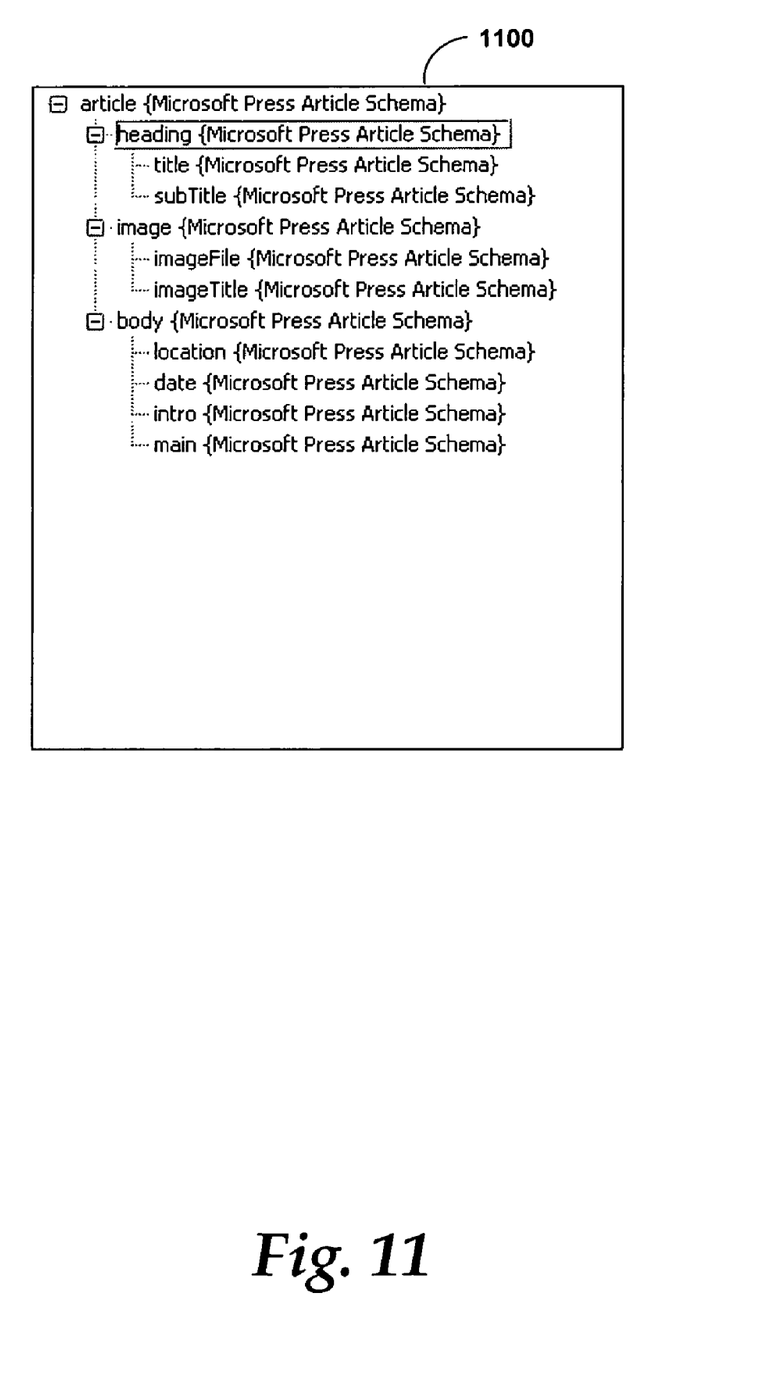
FIG. 11 illustrates an exemplary tree view of the results of a validation of an ML file that is generated according to an associated schema and in which mixed content is ignored, in accordance with aspects of the present invention.

FIG. 11 illustrates an exemplary tree view of the results of a validation of an ML file that is generated according to an associated schema and in which mixed content is ignored, in accordance with aspects of the present invention. Result file 1100 demonstrates, for example, that no errors have resulted from the presence of text outside of a node in the ML file. Accordingly, ignoring the mixed content during validation allows validation to occur without the errors that would otherwise have resulted from the presence of text outside of a node in the ML file.

Figure 12:
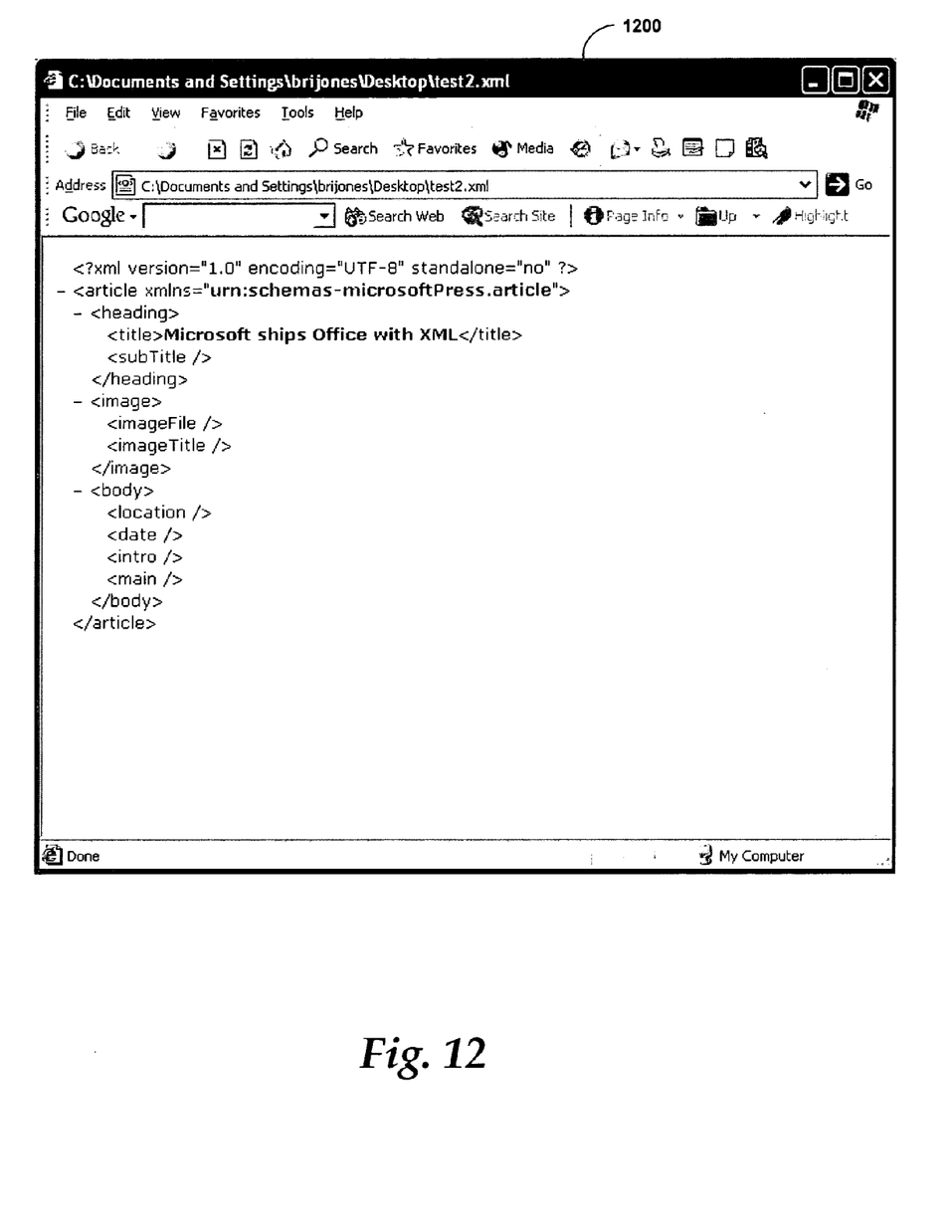
FIG. 12 illustrates an exemplary XML file that is generated according to an associated schema and for which mixed content has been ignored, in accordance with aspects of the present invention.

FIG. 12 illustrates an exemplary XML file that is generated according to an associated schema and for which mixed content has been ignored, in accordance with aspects of the present invention. XML file 1200 comprises, for example, XML code that does not have text (e.g., text 902) that is interspersed within the XML code. The generated XML includes code, for example, for an actual news article that has had the template text 902 removed.

Accordingly, a method and system in accordance with aspects of the present invention have been disclosed that allows the presence of mixed content in, for example, template files and allows the mixed content to be selectively ignored during validation of ML files containing the mixed content.

Figure 13:
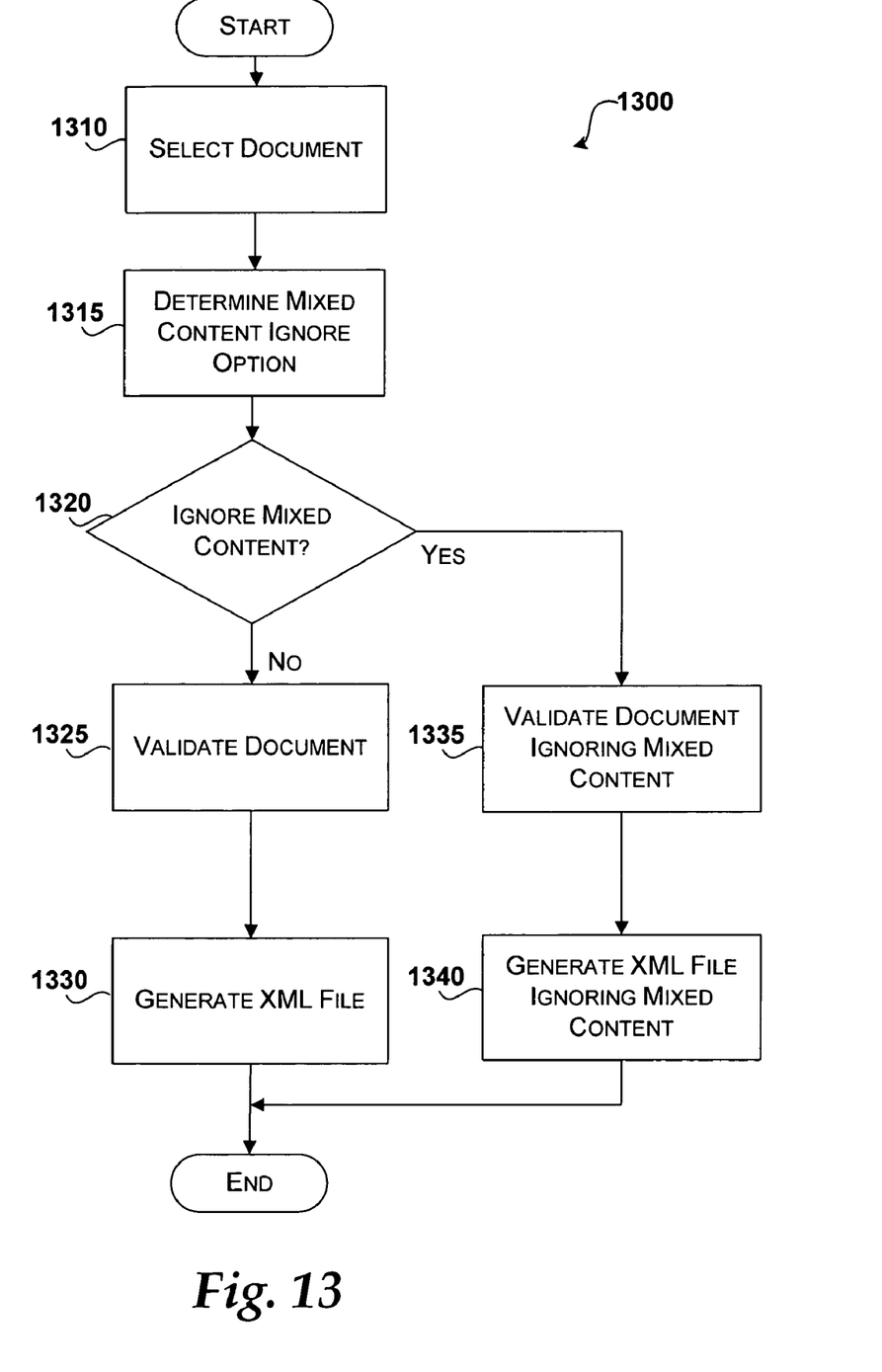
FIG. 13 illustrates a process 1300 flow for providing mixed content flexibility to a word-processing process, in accordance with aspects of the invention.

FIG. 13 illustrates a process 1300 flow for providing mixed content flexibility to a word-processing process, in accordance with aspects of the invention. After a start block, the process moves to block 1310, at which point a word-processor document is selected. The selection of the document may, for example, include opening the selected document within an editor. The document may be an XML (or ML) document that includes mixed content such as text used for prompting in a template file.

Flowing to block 1315, a determination is made as to whether the mixed content of the document is to be ignored. The determination can be made by, for example, selecting an option within a dialog menu. Additionally, the program can determine from various environmental variables (such as the number of times a help function is called, the logon time and experience level of the user, and the like) whether the mixed content can be ignored. The program may also read a declaration in the file such that the creator of the file can specify if mixed content should be ignored when it is opened by the word processor.

At decision block 1320, the determination as to whether to ignore the mixed content is evaluated. When the mixed content is not to be ignored, the process moves to block 1325 where the document is validated according to a schema (e.g., XSD) that is associated with the document. When the mixed content is to be ignored, the process moves to block 1335 where the document is validated according to a schema such that the mixed content is ignored.

At block 1330, an output XML (or other ML) file is generated. The generated file typically contains the mixed content of the validated document. At block 1340, an output XML (or other ML) file is also generated. However, the generated XML file typically does not contain the mixed content as contained in the validated document.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer-executable components, comprising:
    a first component that is arranged to read a word-processor document stored as an XML file;
    a second component that is arranged to use an XSD for interpreting the word-processor document; and
    a third component that is arranged to validate the word-processor document, wherein the validation identifies tagged XML content and untagged non-XML mixed content that is not semantically included within an XML element, and wherein the validation selectively ignores untagged non-XML mixed content within the word-processor document.

2. The computer-readable storage medium of claim 1, wherein the word-processor document is a template file.

3. The computer-readable storage medium of claim 1, wherein the mixed content comprises an image that is not semantically included within an element.

4. The computer-readable storage medium of claim 1, further comprising a formatting component that is arranged to store the word-processor document as an XML file.

5. The computer-readable storage medium of claim 4, wherein the formatting component is further arranged to selectively suppress mixed content within the word-processor document.

6. The computer-readable storage medium of claim 1, wherein the third component is further arranged to display errors encountered in validation.

7. The computer-readable storage medium of claim 1, further comprising an editing component that is arranged to received user commands for changing the word-processing document.

8. The computer-readable storage medium of claim 1, wherein the mixed content is selectively ignored in response to a user input.

9. The computer-readable storage medium of claim 1, wherein the mixed content is selectively ignored in response to environmental variables.

10. A method for handling a word-processing document, comprising:
    determining whether untagged non-XML mixed content within the word-processing document is to be ignored;
    identifying tagged XML content;
    identifying untagged non-XML mixed content that is not semantically included within an XML element; and
    parsing and validating the word-processing document such that untagged non-XML mixed content does not cause validation errors when the determination has been made that untagged non-XML mixed content within the word-processing document is to be ignored.

11. The method of claim 10, wherein the validating is performed in accordance with an XSD file.

12. The method of claim 10, further comprising displaying the document according to the instructions contained within the XML file.

13. The method of claim 10, further comprising storing the document as an XML file.

14. The method of claim 13, wherein the storing the document further comprises suppressing mixed content when the determination has been made that mixed content within the word-processing document is to be ignored.

15. The method of claim 10, wherein the determination is made in response to a user command received in a dialog menu.

16. The method of claim 10, further comprising displaying errors due to encounter mixed content within the word-processing document when the determination has not been made that mixed content within the word-processing document is to be ignored.

17. A system for creating, interpreting, and modifying a word-processor document stored as a markup language "ML" file, comprising:
    a ML file;
    a validation engine configured to validate the ML file, wherein the validation engine identifies tagged ML content and untagged non-ML mixed content that is not semantically included within an ML element and ignores untagged non-ML mixed content that is not semantically included within an ML element within the word-processor document; and
    a word processor configured to read the ML file created in accordance with an associated schema.

18. The system of claim 17, wherein the validation engine selectively validates mixed content in response to user commands received through a system interface.

19. The system of claim 17, wherein the word processor is further configured to output the document to a display.

20. The system of claim 19, wherein the word processor is further configured to save the validated ML file in a long term memory of the system.

21. The system of claim 19, wherein the validation engine is further configured to output validation errors to the display.

22. The system of claim 17, wherein mixed content within the document is selectively output to the display.

* * * * *